US012743411B2

(12) United States Patent
Nogles, Jr. et al.

(10) Patent No.: US 12,743,411 B2
(45) Date of Patent: Sep. 22, 2026

(54) SYSTEM AND METHOD FOR DATA QUALITY FRAMEWORK AND STRUCTURE

(71) Applicant: HARTFORD FIRE INSURANCE COMPANY, Hartford, CT (US)

(72) Inventors: Thomas G. Nogles, Jr., Bryn Mawr, PA (US); Mark A. K. Fine, Downingtown, PA (US); Michael T Curtin, Bryn Mawr, PA (US)

(73) Assignee: HARTFORD FIRE INSURANCE COMPANY, Hartford, CT (US)

(*) Notice: Subject to any disclaimer, the term of this patent is extended or adjusted under 35 U.S.C. 154(b) by 621 days.

(21) Appl. No.: 17/862,591

(22) Filed: Jul. 12, 2022

(65) Prior Publication Data

US 2024/0020291 A1 Jan. 18, 2024

(51) Int. Cl.
*G06F 16/23* (2019.01)
*G06F 16/28* (2019.01)
*G06Q 10/0639* (2023.01)

(52) U.S. Cl.
CPC ........ *G06F 16/2365* (2019.01); *G06F 16/283* (2019.01); *G06Q 10/06395* (2013.01)

(58) Field of Classification Search
CPC .. G06F 16/2365; G06F 16/254; G06F 16/248; G16H 10/60; G06Q 10/06; G06Q 30/02; G06N 20/00
See application file for complete search history.

(56) References Cited

U.S. PATENT DOCUMENTS 10,127,264 B1 * 11/2018 Pyle .................... G06F 16/2365
10,671,628 B2 6/2020 Sullivan et al.
(Continued)

FOREIGN PATENT DOCUMENTS

KR 20220083181 A * 6/2022

OTHER PUBLICATIONS

N. Abdou, et al., "Rigorous Data Validation for Accurate Dashboards: Experience From a Higher Education Institution," in IT Professional, vol. 23, No. 3, pp. 95-101, May 1-Jun. 2021, doi: 10.1109/MITP.2021.3073799 <https://ieeexplore.ieee.org/document/9464119?source=IQplus> (Year: 2021).*

*Primary Examiner* — Jerry O'Connor
*Assistant Examiner* — Michael R Koester
(74) *Attorney, Agent, or Firm* — Buckley, Maschoff & Talwalkar LLC

(57) ABSTRACT

A validation database may contain electronic records connected to a data quality framework for an enterprise (including a set of data validation rules). A data central console platform may provide validation administration for the data quality framework and an operational dashboard using an interactive graphical display via a distributed communication network. A data loading platform may retrieve information to be validated from governed datasets. A data quality computer server may receive the information to be validated and retrieve, from the validation database, the set of data validation rules. The computer server may then automatically execute the set of data validation rules on the information to be validated to generate validation results and store the validation results. The data loading platform may automatically transmit an alert message via a communication link to a communication address based on the validation results generated by data quality computer server.

17 Claims, 16 Drawing Sheets

(56) References Cited

U.S. PATENT DOCUMENTS

| | | | |
|---|---|---|---|
| 11,016,936 | B1 * | 5/2021 | Higgins ................ G06F 16/254 |
| 11,212,339 | B2 | 12/2021 | Aisthorpe-Buckley |
| 11,256,702 | B2 | 2/2022 | Colcord et al. |
| 2011/0246415 | A1 | 10/2011 | Li et al. |
| 2019/0294613 | A1 | 9/2019 | Sullivan et al. |
| 2020/0026710 | A1 | 1/2020 | Przada et al. |
| 2020/0272598 | A1 | 8/2020 | Grasselt et al. |
| 2021/0286663 | A1 * | 9/2021 | Thomas ................ G06F 11/076 |
| 2022/0138192 | A1 | 5/2022 | Colcord et al. |
| 2022/0405235 | A1 * | 12/2022 | Sahgal ................ G06F 16/2365 |
| 2023/0306139 | A1 * | 9/2023 | Shah ..................... G06F 21/602 |
| 2024/0013231 | A1 * | 1/2024 | Wang ............... G06Q 10/06375 |

* cited by examiner

1200

| DATA QUALITY ID 1202 | DATE (TIME) 1204 | VENDOR ID 1206 | ALERTS 1208 | ... | VENDOR COMMUNICATION 1210 |
| --- | --- | --- | --- | --- | --- |
| DQ_101 | 10/26/2025 (08:05) | V_101 | NONE | | NONE |
| DW_102 | 10/27/2025 (07:58) | V_101 | A_101 | | EMAIL ALERT |
| DQ_103 | 10/28/2025 (08:13) | V_101 | NONE | | WEEKLY SUMMARY |
| DQ_104 | 10/26/2029 (08:00) | V_101 | A_102, A_103 | | EMAIL ALERT |

FIG. 12

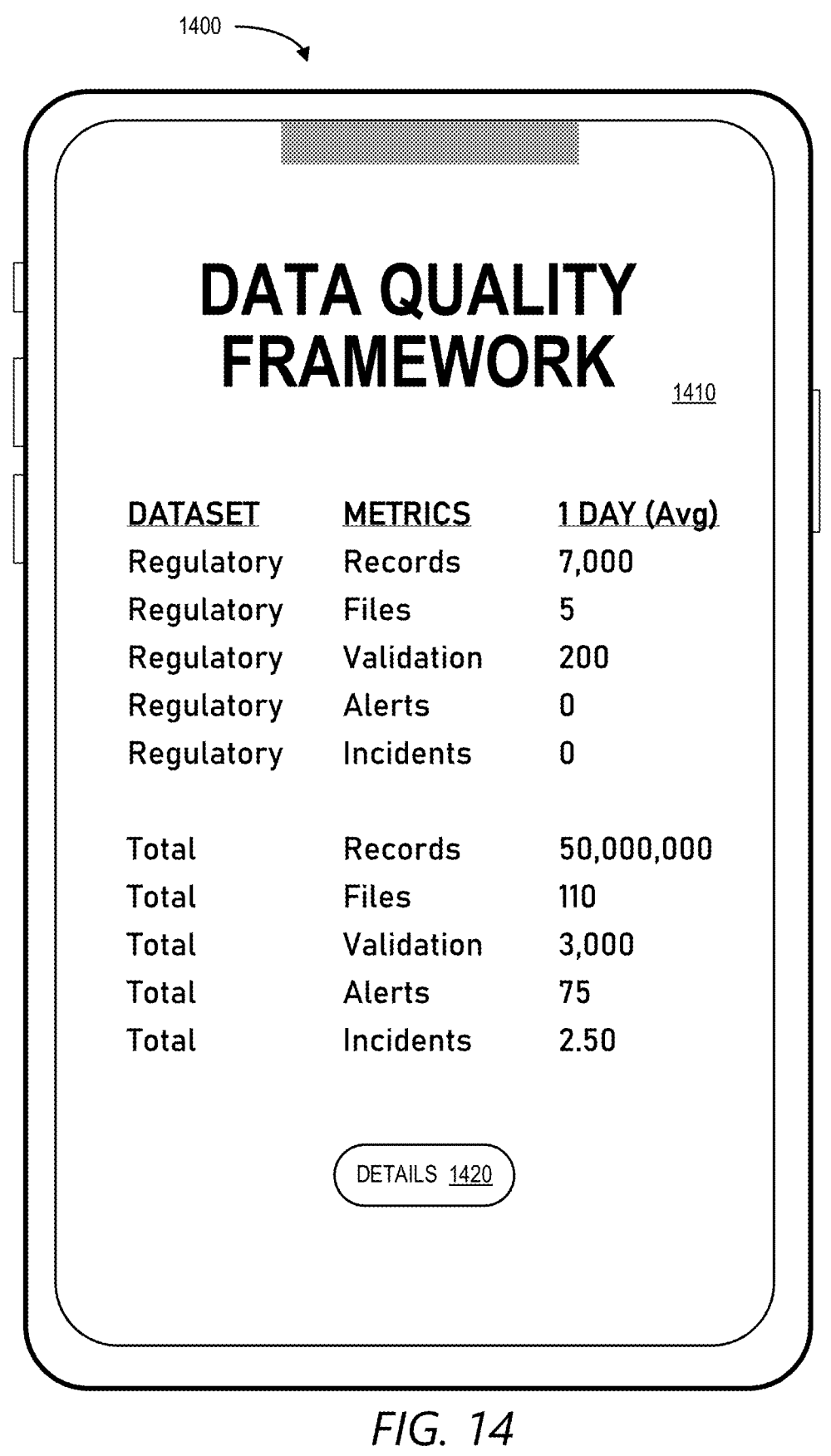

| DATASET | METRICS | 1 DAY (Avg) |
| --- | --- | --- |
| Regulatory | Records | 7,000 |
| Regulatory | Files | 5 |
| Regulatory | Validation | 200 |
| Regulatory | Alerts | 0 |
| Regulatory | Incidents | 0 |
| Total | Records | 50,000,000 |
| Total | Files | 110 |
| Total | Validation | 3,000 |
| Total | Alerts | 75 |
| Total | Incidents | 2.50 |

FIG. 14

SYSTEM AND METHOD FOR DATA QUALITY FRAMEWORK AND STRUCTURE

TECHNICAL FIELD

The present application generally relates to computer systems and more particularly to computer systems that are adapted to accurately and/or provide an automatic data quality framework for an enterprise.

BACKGROUND

An enterprise may periodically process a substantial amount of data. For example, the enterprise might import and/or exports a number of files that each contain a large number of electronic records (e.g., representing assets in a portfolio, customers, purchase orders, financial information, etc.). In some cases, the enterprise might want to ensure the quality of the information being processed (e.g., is the information complete, is the information correct, is the information consistent, etc.). For example, a governmental regulation might require that a certain level of accuracy be associated with the information being processed by the enterprise. Manually reviewing a substantial amount of information, however, can be time-consuming, expensive, and error-prone task—especially when a large number of files and/or electronic records are involved (e.g., hundreds of thousands of records that each include multiple attributes that need to be validated).

It would therefore be desirable to provide improved systems and methods to accurately and/or automatically provide a data quality framework for an enterprise. Moreover, the results should be easy to access, understand, interpret, update, etc.

SUMMARY OF THE INVENTION

According to some embodiments, systems, methods, apparatus, computer program code and means are provided to provide a data quality framework for an enterprise that is implemented via a data quality computer server. A validation database may contain electronic records connected to a data quality framework for an enterprise (including a set of data validation rules). A data central console platform may provide validation administration for the data quality framework and an operational dashboard using an interactive graphical display via a distributed communication network. A data loading platform may retrieve information to be validated from governed datasets. A data quality computer server may receive the information to be validated and retrieve, from the validation database, the set of data validation rules. The computer server may then automatically execute the set of data validation rules on the information to be validated to generate validation results and store the validation results. The data loading platform may automatically transmit an alert message via a communication link to a communication address based on the validation results generated by data quality computer server.

Some embodiments comprise: means for storing, in a validation database, electronic records connected to a data quality framework for an enterprise, the electronic records including a set of data validation rules; means for providing, via a data central console platform, validation administration for the data quality framework and an operational dashboard using an interactive graphical display via a distributed communication network; means for retrieving, by a data loading platform from governed datasets, information to be validated; means for receiving, at a computer processor of the data quality computer server, the information to be validated; means for automatically executing the set of data validation rules on the information to be validated to generate validation results; means for storing the validation results; and means for automatically transmitting an alert message via a communication link to a communication address based on the validation results.

In some embodiments, a communication device associated with a data quality computer server exchanges information with remote devices in connection with an interactive graphical data quality interface. The information may be exchanged, for example, via public and/or proprietary communication networks.

A technical effect of some embodiments of the invention is an improved and computerized way to accurately and/or automatically provide a data quality framework for an enterprise in a way that provides fast, accurate, efficient, and useful results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 12 is a tabular portion of a data quality database according to some embodiments.

FIG. 14 illustrates a smartphone display according to some embodiments.

DETAILED DESCRIPTION

Figure 1:
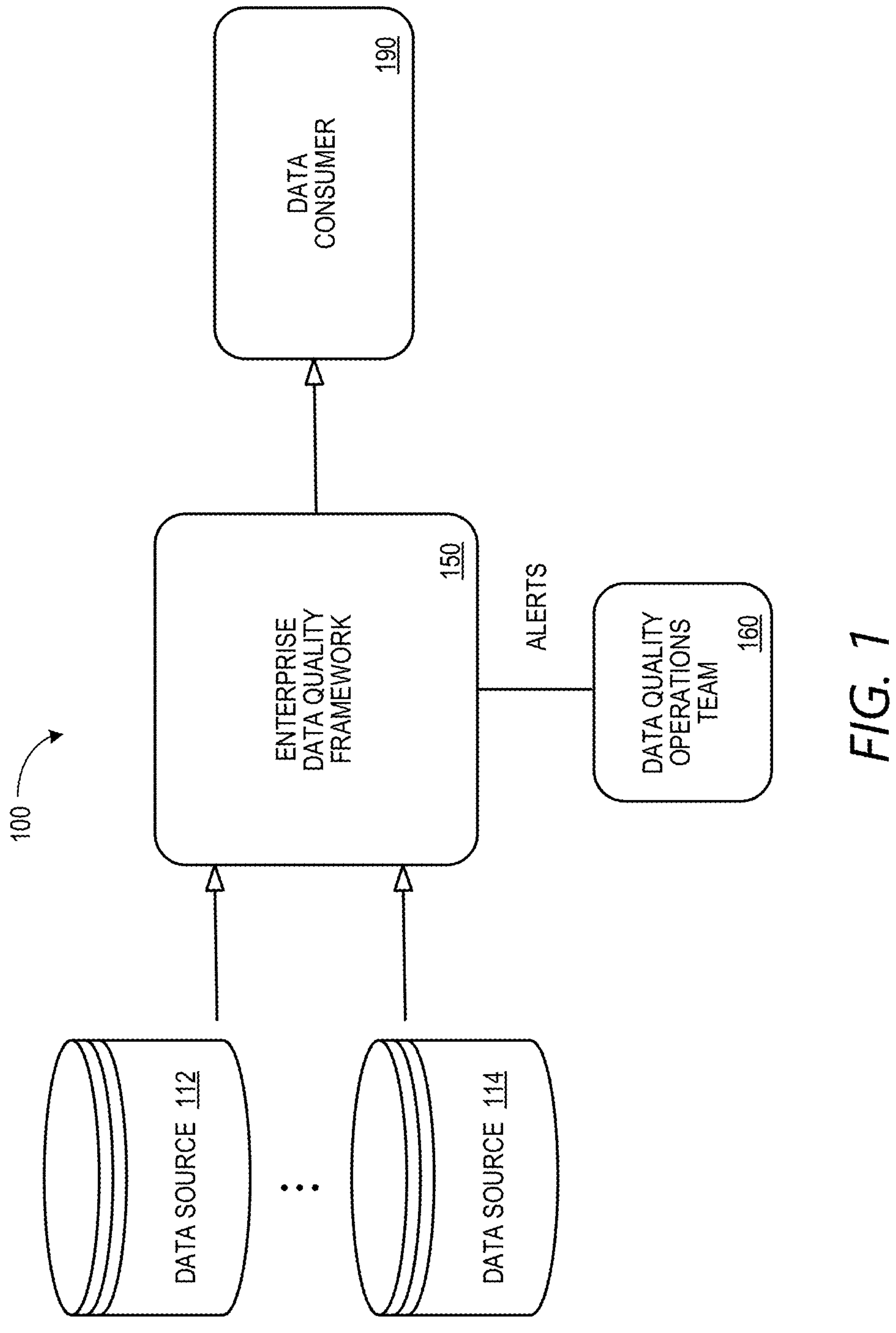
FIG. 1 a system that might utilize some embodiments of the present invention.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data availability, consistency, and analytics associated with a data quality framework. The present invention is directed to more than merely a computer implementation of a routine or conventional activity previously known in the industry as it provides a specific advancement in the area of electronic record availability, consistency, and analysis by providing improvements in the operation of a computer system that uses machine learning and/or predictive models to ensure data quality. The present invention provides improvement beyond a mere generic computer implementation as it involves the novel ordered combination of system elements and processes to provide improvements in the speed at which such data can be made available and consistent results. Some embodiments of the present invention are directed to a system adapted to automatically validate information, analyze electronic records, aggregate data from multiple sources including text mining, determine appropriate quality information, etc. Moreover, communication links and messages may be automatically established (e.g., to provide data quality alerts), aggregated, formatted, exchanged, etc. to improve network performance (e.g., by reducing an amount of network messaging bandwidth and/or storage required to support data quality).

FIG. 1 a system 100 that might utilize some embodiments of the present invention. An enterprise data quality framework 150 may receive information from data sources 112, 114 for eventual use by a data consumer 190. A data quality operations team 160 may establish data quality rules that can be used to ensure that the information being processed by the system 100 is accurate, complete, consistent, etc. By way of example only, the enterprise data quality framework 150 might be associated with a financial institution associated with a product line-up includes hundreds of mutual funds and/or Exchange Traded Funds ("ETFs") in a variety of styles and asset classes. The funds might be designed to help address investors' evolving needs by leveraging a distinct risk-optimized approach, which identifies risks within each asset class and then deliberately and systematically reallocates capital toward risks more likely to enhance return potential. In this case, regulatory and other rules might require that details about the funds be periodically disclosed (e.g., each business day at 9:00 AM). In this case, the enterprise data quality framework 150 might assemble and release a batch of data each day. According to some embodiments, data quality alerts may be generated when one or more quality rules are violated (e.g., so that the situation can be investigated to correct the information in a timely fashion).

Figure 2:
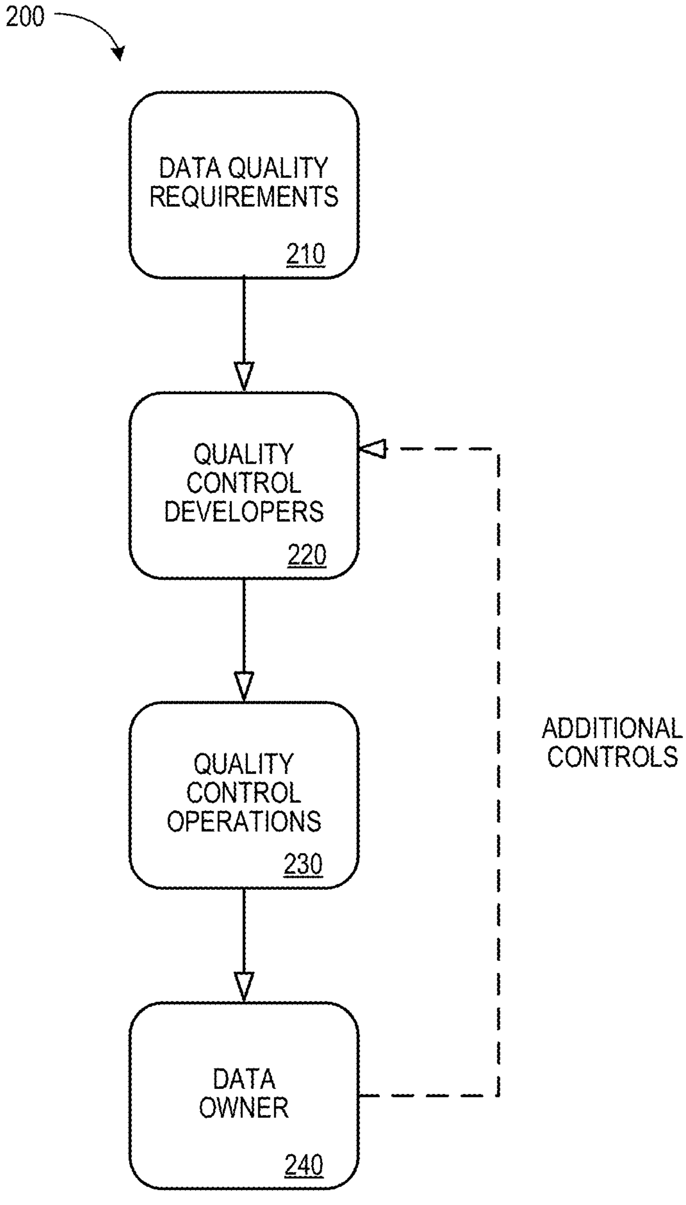
FIG. 2 illustrates parties associated with a data governance according to some embodiments.

FIG. 2 illustrates parties 200 associated with a data governance according to some embodiments. Initially, data quality requirements 210 may be established for an enterprise, such as by a data owner or business data steward responsible for the domain of the data. The data steward might play an oversight or data governance role within an organization and be responsible for ensuring the quality and fitness of data assets (including the metadata for those data assets). Quality control developers 220 may provide implementation of reasonable quality controls (note that "perfect" quality might be prohibitively costly or time consuming) and quality control operations 230 may perform the ongoing quality monitoring. The quality control operations 230 might, for example, provide observations and/or metrics to the data owner 240 to facilitate quality oversight and/or feedback. The feedback may, for example, create additional controls that can be use by the data quality developers 220 to improve the quality of the information (as illustrated by the dashed arrow in FIG. 2).

Figure 3:
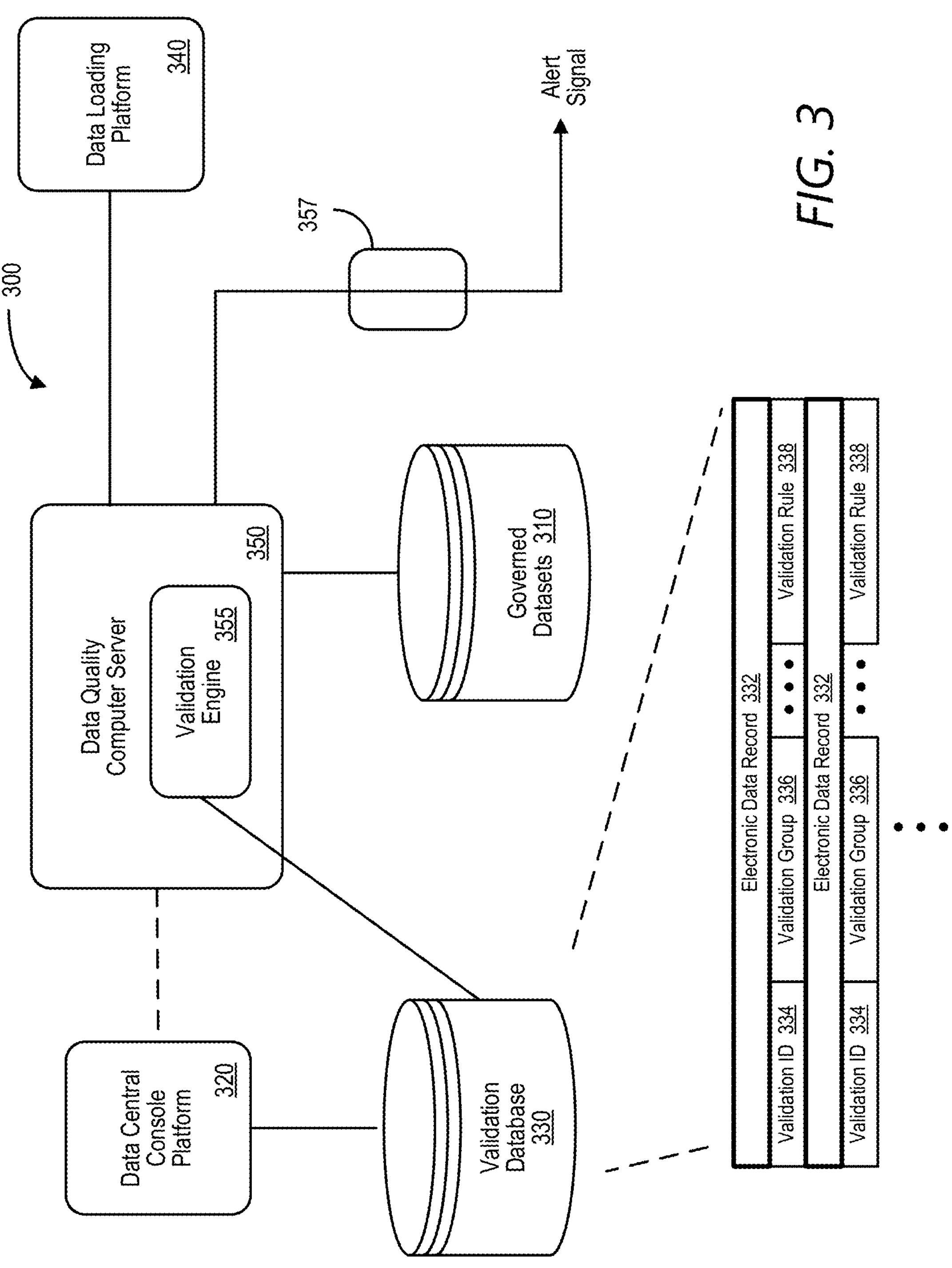
FIG. 3 is a high-level block diagram of a data quality framework system in accordance with some embodiments.

FIG. 3 is a high-level block diagram of a data quality system 300 according to some embodiments of the present invention. In particular, the system 300 includes a data quality computer server 350 that may access governed datasets 310 (e.g., information to be monitored for quality control) and information in a validation database 330 (e.g., storing a set of electronic records 332 associated with validation rules, each record including, for example, one or more validation identifiers 334, a validation group 336, the specific validation rule logic 338, etc.). The information in the validation database 330 may be created and/or updated via a data central console platform 320. The data quality computer server 350 may also store information into other data stores and utilize a Graphical User Interface ("GUI") and validation engine 355 to view, analyze, and/or update the electronic records. The data quality computer server 350 may also exchange information with a data loading platform 340 and generate alert signals (e.g., transmitted to remote devices via a firewall 357). Note that the data quality computer server 350 and/or any of the other devices and methods described herein might be associated with a third party, such as a vendor that performs a service for an enterprise.

The data quality computer server 350 and/or the other elements of the system 300 might be, for example, associated with a Personal Computer ("PC"), laptop computer, smartphone, an enterprise server, a server farm, and/or a database or similar storage devices. According to some embodiments, an "automated" data quality computer server 350 (and/or other elements of the system 300) may facilitate the automated access and/or update of electronic records. As used herein, the term "automated" may refer to, for example, actions that can be performed with little (or no) intervention by a human.

As used herein, devices, including those associated with the data quality computer server 350 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The data quality computer server 350 may store information into and/or retrieve information from the validation database 330. The validation database 330 may be locally stored or reside remote from the data quality computer server 350. As will be described further below, the validation database 330 may be used by the data quality computer server 350 in connection with a data quality review process. Although a single data quality computer server 350 is shown in FIG. 3, any number of such devices may be included. Moreover, various devices described herein might be combined according to embodiments of the present invention.

For example, in some embodiments, the data quality computer server 350 and the validation database 330 might be co-located and/or may comprise a single apparatus and/or be implemented via a cloud-based computing environment.

Figure 4:
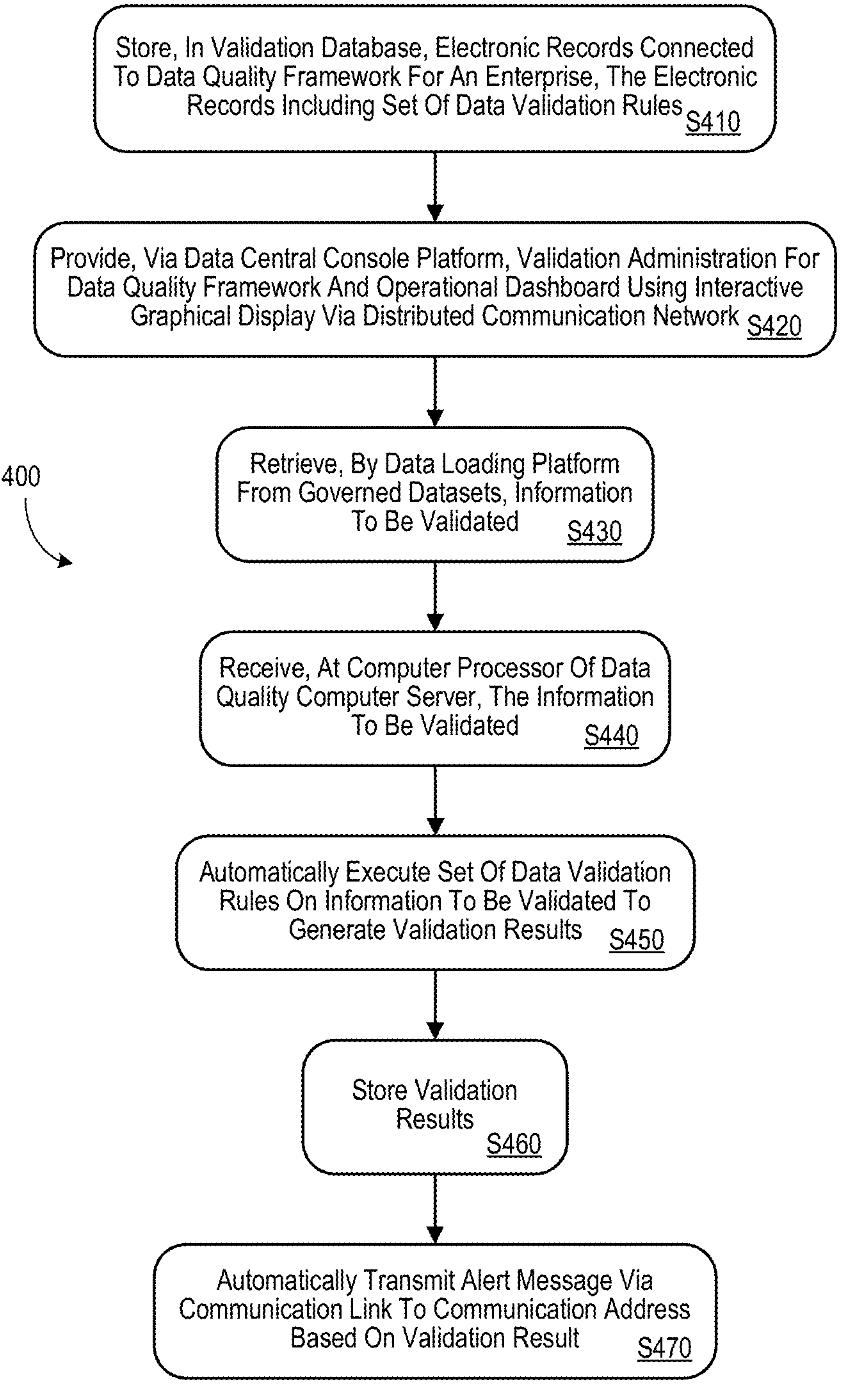
FIG. 4 illustrates a data quality framework method according to some embodiments of the present invention.

Note that the system 300 of FIG. 3 is provided only as an example, and embodiments may be associated with additional elements or components. FIG. 4 illustrates a method 400 that might be performed by some or all of the elements of the system 300 described with respect to FIG. 3, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, the system may store, in a validation database, electronic records connected to a data quality framework for an enterprise (including a set of data validation rules). At S420, a data central console platform may provide validation administration for the data quality framework along with an operational dashboard that uses an interactive graphical display via a distributed communication network (e.g., a web browser-based interface).

At S430, a data loading platform may retrieve, from governed datasets, information to be validated. A computer processor of a data quality computer server may receive the information to be validated at S440 and automatically execute the set of data validation rules on the information to be validated to generate validation results at S450. At S460, the validation results may be stored, and the system may automatically transmit an alert message via a communication link to a communication address based on the validation results at S470.

Figure 5:
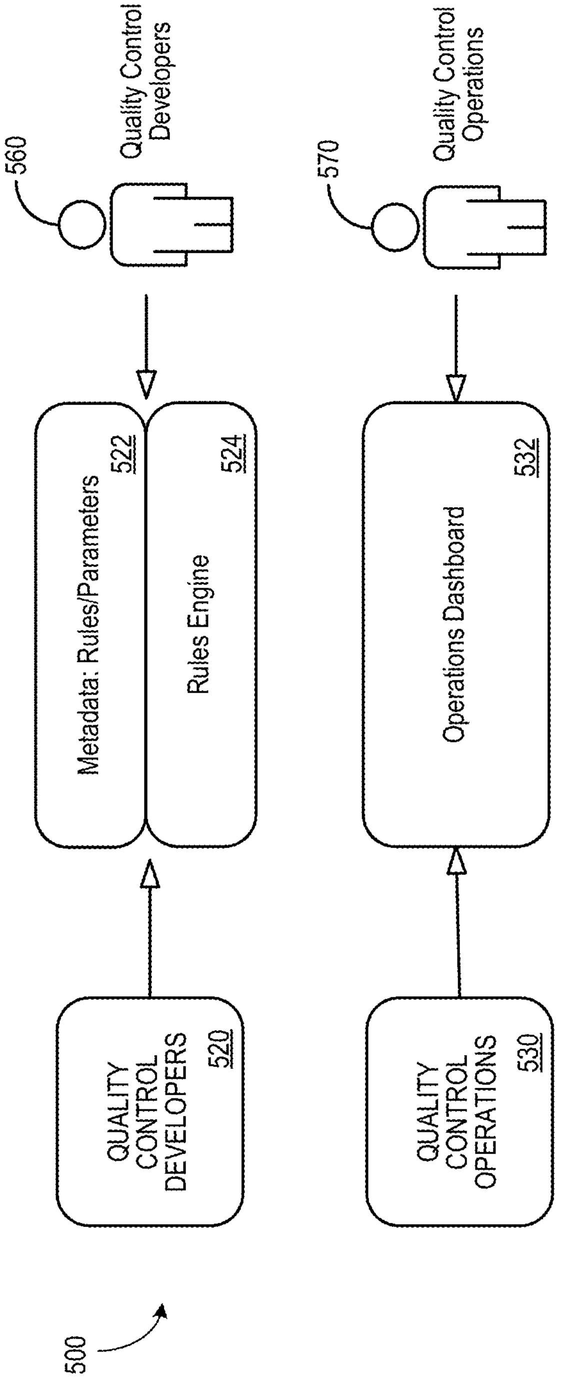
FIG. 5 is data quality implementation in accordance with some embodiments.

FIG. 5 is data quality implementation 500 in accordance with some embodiments. Quality control developers 520 may implement quality controls by defining metadata 522 (e.g., validation rules and/or parameters) and a rules engine 524 which can then be used by other quality control developers 560 (e.g., to encode other rules, define alerts based on threshold amounts, etc.). Quality control operations 530 may perform ongoing quality monitoring using an operations dashboard 532 that can be accessed by other quality control operations 570 (e.g., to perform incident management, research exceptions, remove errors that are merely noise in the overall picture, etc.).

Figure 6:
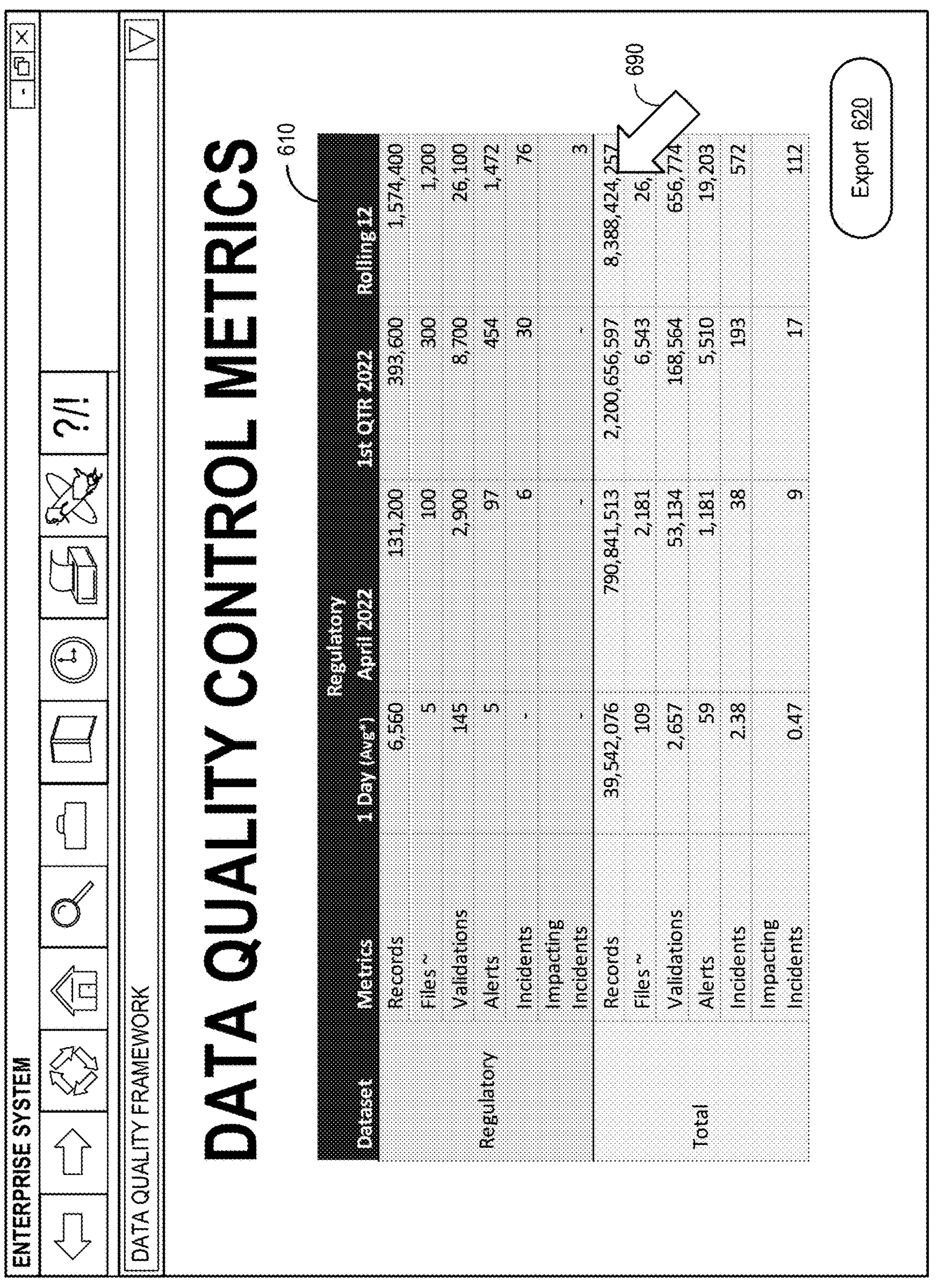
FIG. 6 illustrates a quality control metrics display according to some embodiments.

In some embodiments, a quality control framework may provide metrics to monitor performance. For example, FIG. 6 illustrates a quality control metrics display 600 in accordance with some embodiments. The display 600 includes a table 610 that provides numerical values for various datasets (e.g., a regulatory dataset and a total dataset). The table 610 may provide, for various time frames (e.g., hourly, daily, weekly, monthly quarterly, yearly, etc.), a total number of records that were processed, an overall number of files, validations, alerts, incidents, impacting incidents, etc. Selection of a portion of the table (e.g., via a touchscreen or computer mouse pointer 690) may result in the display of additional details about that portion. Selection of an "Export" icon 620 may save the data in a particular format (e.g., to be used with a spreadsheet application).

Figure 7:
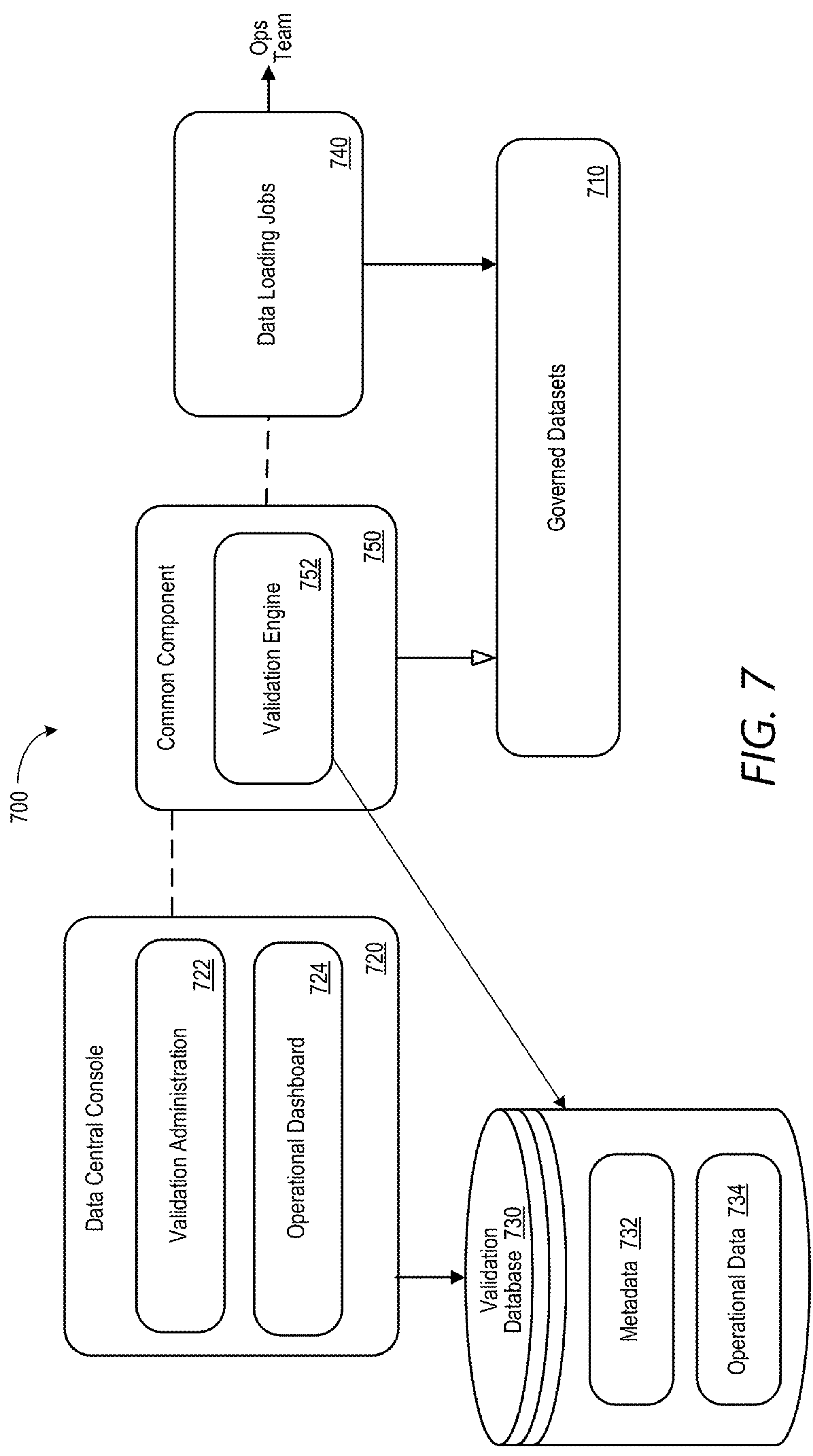
FIG. 7 illustrates a quality control framework in accordance with some embodiments.

FIG. 7 illustrates a quality control framework 700 in accordance with some embodiments. The framework 700 includes governed datasets 710 that will be monitored for quality control. A data central console 720 (e.g., a web browser-based application) may perform validation administration 722 and provide an operation dashboard 724 and store information into a validation database 730. The validation database 730 may include, for example, metadata 732 and/or operational data 734 (e.g., the results of a quality control review). A data loading jobs platform 740 may load the datasets to be reviewed from the governed datasets 710 and a common component 750 may use a validation engine 752 to execute validation rules from the validation database 730. For example, if a governed dataset 710 represented a list of stocks in a mutual fund, a validation rule might comprise "does every stock include a number of shares and a current value?" The data loading jobs platform 740 may also automatically transmit alerts (e.g., via a report transmitted to an email address) to an operations team (e.g., when more than a pre-determined number of records fail to pass one or more validation tests) so that the issue may be resolved in a timely manner.

Figure 8:
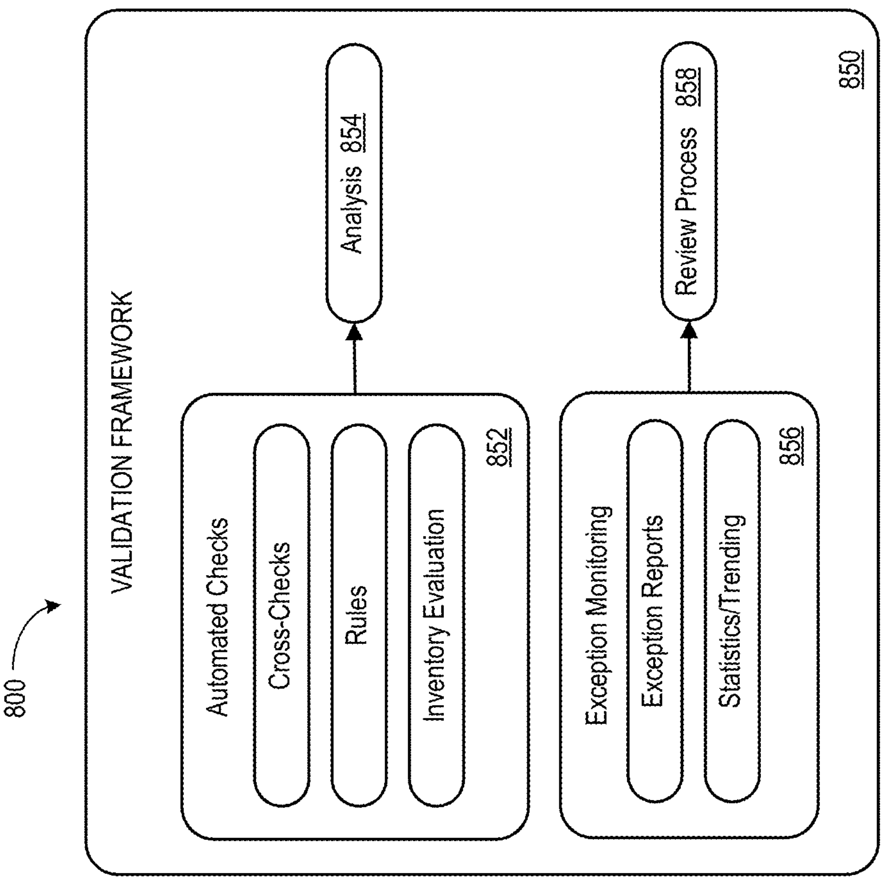
FIG. 8 is a system with a validation framework according to some embodiments.

FIG. 8 is a system 800 with a validation framework 850 according to some embodiments. The validation framework 850 may perform automated checks 852 (e.g., quality control cross-checks, rules, and/or inventory evaluations) as part of a data quality analysis 854. According to some embodiments, the validation framework 850 also performs exception monitoring 856 (e.g., to generate exception reports, statistics such as quality control metrics, and/or implement a trend analysis) as part of a data quality review 858 process.

Figure 9:
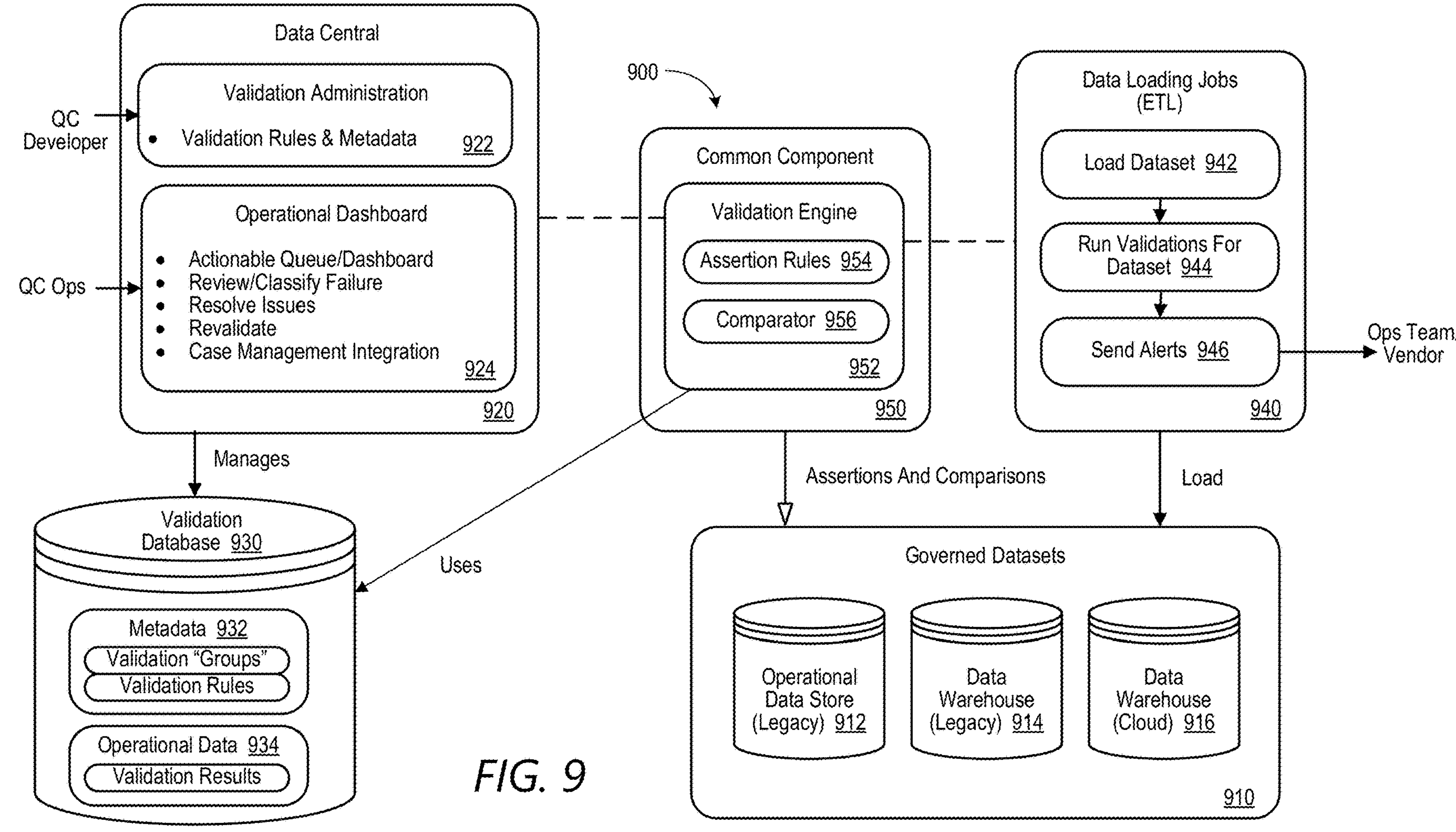
FIG. 9 is a more detailed quality control framework in accordance with some embodiments.

FIG. 9 is a more detailed quality control framework 900 in accordance with some embodiments. The framework 900 includes governed datasets 910 that will be monitored for quality control. The governed datasets 910 might include, for example, a legacy Operational Data Store ("ODS") 912 designed to integrate data from multiple sources. The ODS 912 may be used for operational reporting and as a source of data for an Enterprise Data Warehouse ("EDW") (e.g., to support operational reporting, controls, and decision making). The governed datasets 910 may further include a legacy data warehouse 914 (e.g., a central repository of integrated data from disparate sources that is used for reporting and data analysis), a cloud-based data warehouse 916 (e.g., a SNOWFLAKE® database), etc.

A data central console 920 (e.g., a web browser-based application) may perform validation administration 922, such as by receiving validation rules and metadata from a quality control developer (e.g., to define or refine thresholds to reduce problems that merely represent noise instead of a serious data quality issue). According to some embodiments, the data central console 920 may also provide an operation dashboard 924 supporting an actionable queue, review and classify failures, resolve issues, re-validate data, integrate case management, etc. and store information into a validation database 930 (which is managed by the data central console 920 and used by a validation engine 952). The validation database 930 may include, for example, metadata 932 (e.g., validation "groups" that should undergo a data quality process together and validation rules) and/or operational data 934 (e.g., validation results of a quality control review).

According to some embodiments, the framework 900 further includes data loading jobs platform 940 that performs Extract Transform Load ("ETL") functions to load datasets 942 to be reviewed from the governed datasets 910. The data loading jobs platform 940 may also run validations for the dataset 944 and send alerts 946 to an operations team or vendor. A common component 950 may use the validation engine 952 to assert validation rules 954 (e.g., queries that should be true) from the validation database 930 and run a comparator 956 (e.g., "is dataset 1 dataset 2?").

In this way, embodiments may provide a lightweight framework 900 to monitor and improve data quality for the governed datasets 910. Moreover, the framework may be Structured Query Language ("SQL")-based and validations may be automatically executed at the time data is loaded.

Figure 10:
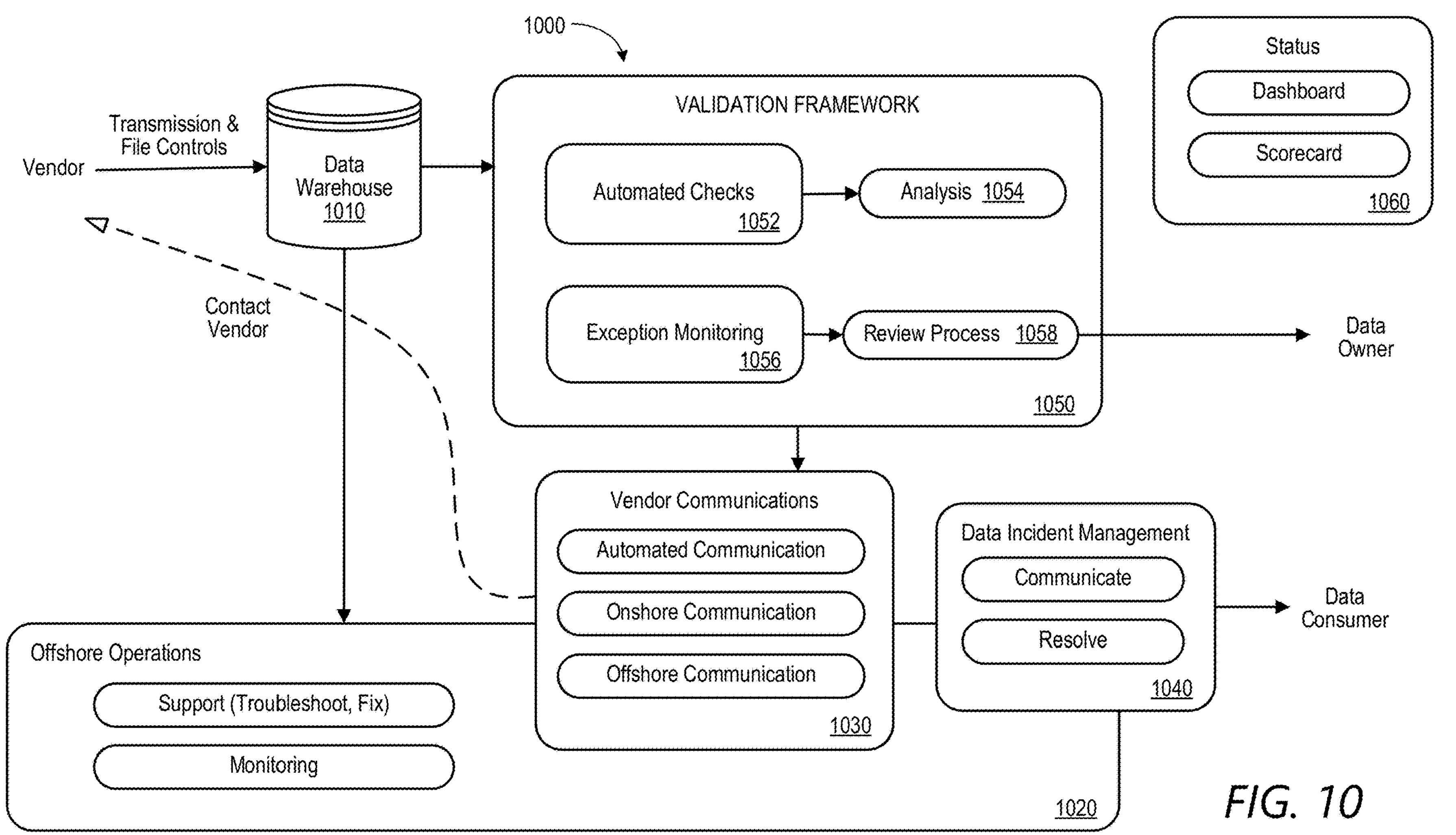
FIG. 10 more detailed system according to some embodiments.

FIG. 10 more detailed system 1000 according to some embodiments. The system 1000 includes processing to support a data warehouse 1010 that receives information from a vendor (e.g., transmission and file controls to support a technical validation). Offshore operations 1020 may provide technical support (e.g., to troubleshoot and/or fix problems) and perform a data quality monitoring function. A validation framework 1050 may access the data warehouse 1010 to perform automated checks 1052 (e.g., quality control cross-checks, rules, and/or inventory evaluations) as part of a data quality analysis 1054. According to some embodiments, the validation framework 1050 also performs exception monitoring 1056 (e.g., to generate exception reports, statistics such as quality control metrics, and/or perform a trend analysis) as part of a data quality review 1058 process (and transmit a result of the review 1058 to a data owner).

Information from the validation framework 1050 may support vendor communications 1030, such as automated communication, onshore communication, and/or offshore communication. Data incident management 1040 may support communication with data consumers and/or stakeholders and/or resolve problems. A status 1060 may support a data quality dashboard display and/or a data quality scorecard.

Figure 11:
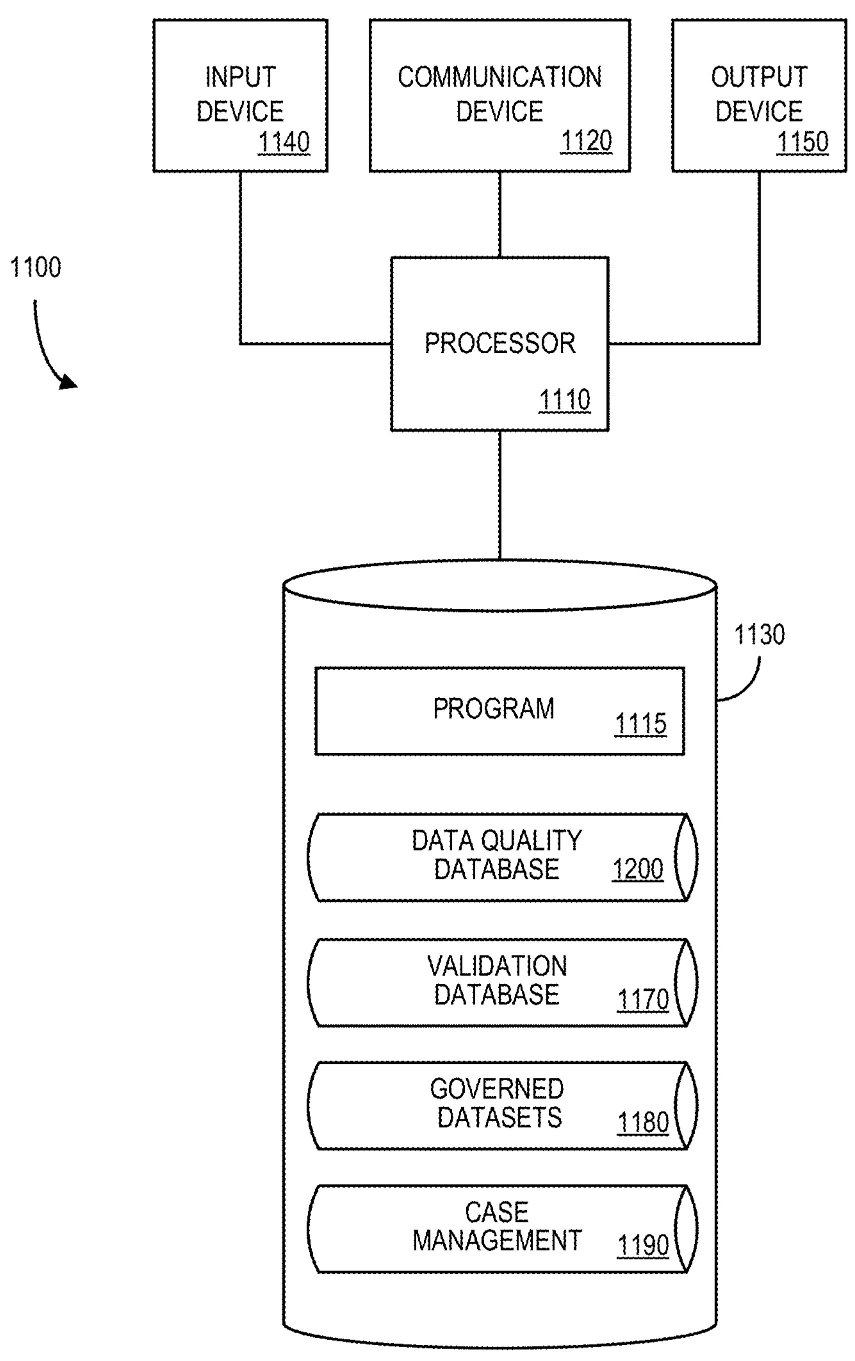
FIG. 11 is an apparatus in accordance with some embodiments.

The embodiments described herein may be implemented using any number of different hardware configurations. For example, FIG. 11 illustrates an apparatus 1100 that may be, for example, associated with the systems 300, 700, 900 described with respect to FIGS. 3, 7, and 9, respectively, or any other embodiment described herein. The apparatus 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more remote administrator or operator devices (e.g., PCs and smartphones), data quality stakeholders, and/or third-party platforms. Note that data exchanged via the communication device 1120 may utilize security features, such as encryption between an insurance company server and resource request devices. The security features might be associated with, for example, web servers, firewalls, and/or PCI infrastructure. The apparatus 1100 further includes an input device 1140 (e.g., a mouse and/or keyboard to enter information about validation groups, validation rules, etc.) and an output device 1150 (e.g., to output reports regarding data quality, summary logs, recommended actions, alerts, etc.).

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1115 and/or a data quality tool or application for controlling the processor 1110. The processor 1110 performs instructions of the program 1115, and thereby operates in accordance with any of the embodiments described herein. For example, the processor 1110 may provide validation administration for the data quality framework and an operational dashboard using an interactive graphical display via the communication device 1120. The processor 1110 may retrieve information to be validated from governed datasets 1180 and also retrieve, from a validation database 1170, the set of data validation rules. The processor 1110 may then automatically execute the set of data validation rules on the information to be validated and generate validation results that are stored. The processor 1110 may automatically transmit an alert message via a communication link to a communication address based on the validation results.

The program 1115 may be stored in a compressed, uncompiled and/or encrypted format. The program 1115 may furthermore include other program elements, such as an operating system, a database management system, and/or device drivers used by the processor 1110 to interface with peripheral devices.

As used herein, information may be "received" by or "transmitted" to, for example: (i) the apparatus 1100 from another device; or (ii) a software application or module within the apparatus 1100 from another software application, module, or any other source.

In some embodiments (such as shown in FIG. 11), the storage device 1130 further stores a data quality database 1200, the validation database 1170, the governed datasets 1180, and case management 1190 information (e.g., to generate and track "tickets" to resolve data quality issues). An example of a database that might be used in connection with the apparatus 1100 will now be described in detail with respect to FIG. 12. Note that the database described herein is only an example, and additional and/or different information may be stored therein. Moreover, various databases might be split or combined in accordance with any of the embodiments described herein. For example, the data quality database 1200 and validation database 1170 might be combined and/or linked to each other within the program 1115.

Referring to FIG. 12, a table is shown that represents the data quality database 1200 that may be stored at the apparatus 1100 according to some embodiments. The table may include, for example, entries associated with an automated data quality review process. The table may also define fields 1202, 1204, 1206, 1208, 1210 for each of the entries. The fields 1202, 1204, 1206, 1208, 1210 may, according to some embodiments, specify: a data quality identifier 1202, a date and time 1204, a vendor identifier 1206, alerts 1208, and a vender communication 1210. The data quality database 1200 may be created and updated, for example, based on information electrically received from various data sources (e.g., including when new data is uploaded, a new validation process is performed, etc.).

The data quality identifier 1202 may be, for example, a unique alphanumeric code identifying a data quality review process that was performed on the specific date and time 1204. The vendor identifier 1206 may identify a stakeholder associated with a governed dataset. According to some embodiments, vendor identifier 1206 includes, or is linked to, a particular communication channel and/or communication address (e.g., an email address, a web account, a smartphone number, a dashboard display, a chat interface such as MICROSOFT® TEAMS, etc.). The alerts 1208 may represent one or more potential data quality issues (if any) that were identified in a governed dataset (e.g., today's dataset is more than 5% smaller than yesterday's dataset). The vender communication 1210 may record how the alerts 1208 were transmitted to the vendor (e.g., via an email message, a weekly summary, a dashboard display, etc.).

Thus, embodiments may provide an automated, accurate, and efficient way to perform data validation for an enterprise. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of enterprises (e.g., associated with mutual funds), embodiments may instead be associated with other types of enterprises in addition to and/or instead of those described herein (e.g., an online business, an insurance company, financial institutions, hospitals, etc.). Similarly, although certain types of data quality rules and characteristics were described in connection some embodiments herein, other types of characteristics might be used instead of, or in addition to, those mentioned.

Figure 13:
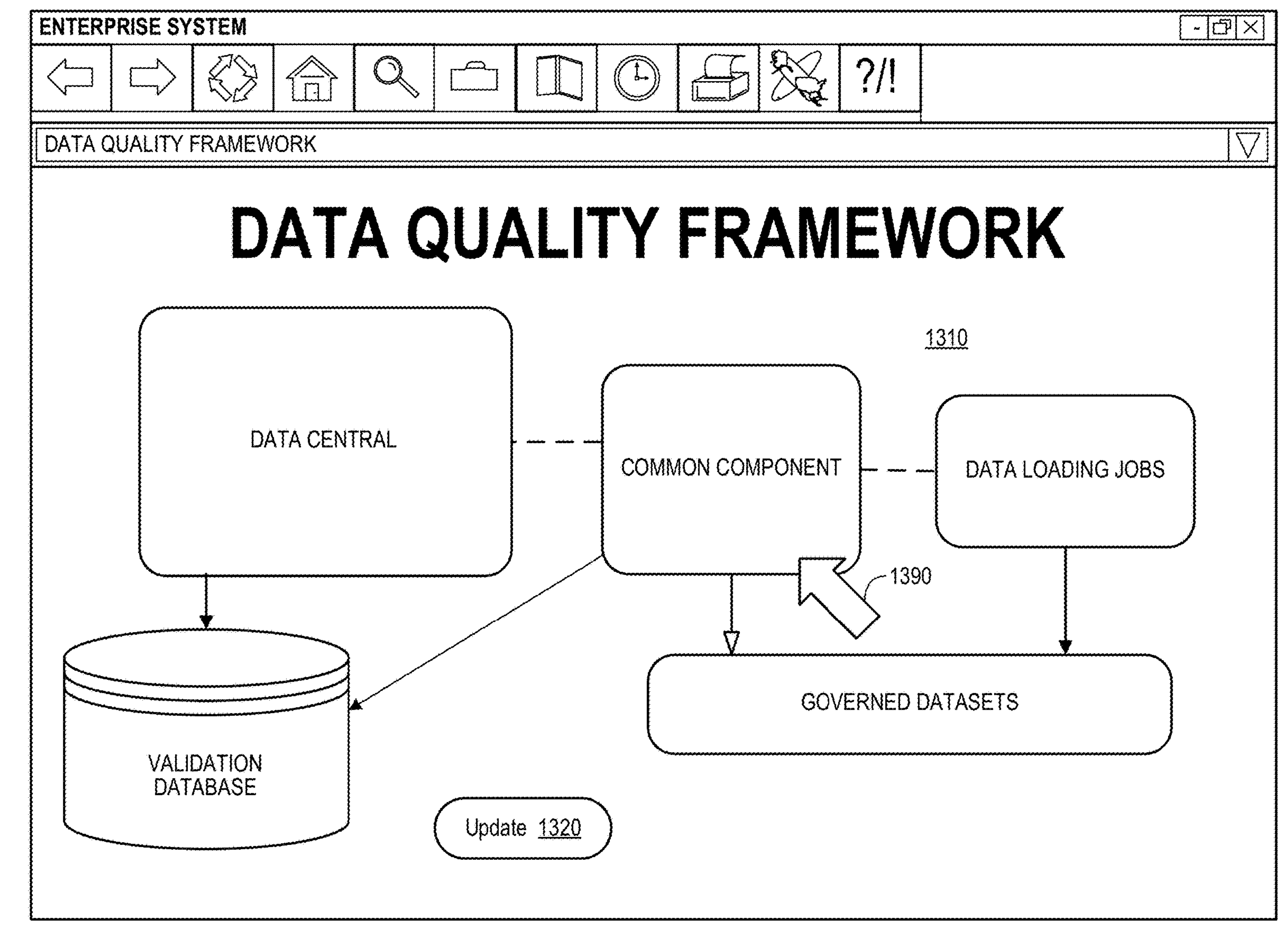
FIG. 13 illustrates a data quality framework administrator or operator display in accordance with some embodiments.

Note that the displays and devices illustrated herein are only provided as examples, and embodiments may be associated with any other types of interfaces. For example, FIG. 13 is an administrator or operator display 1300 including graphical representations of elements 1310 of a data quality system. Selection of a portion or element of the display 1300 might result in the presentation of additional information about that portion or device (e.g., a popup window presenting a more detailed view of data mappings, communication addresses for vendors, or other specifics of the system implementation) or let an operator or administrator enter or annotate additional information about the data quality system (e.g., based on his or her experience and expertise). Selection of an "Update" icon 1320 (e.g., by touchscreen or computer mouse pointer 1390) might cause the system or platform to save changes, transmit data quality information to another party, etc. According to some embodiments a data quality signal or alert may be automatically transmitted to a communication device (e.g., associated with a data owner or vendor) when a quality value moves beyond a threshold value.

Figure 15:
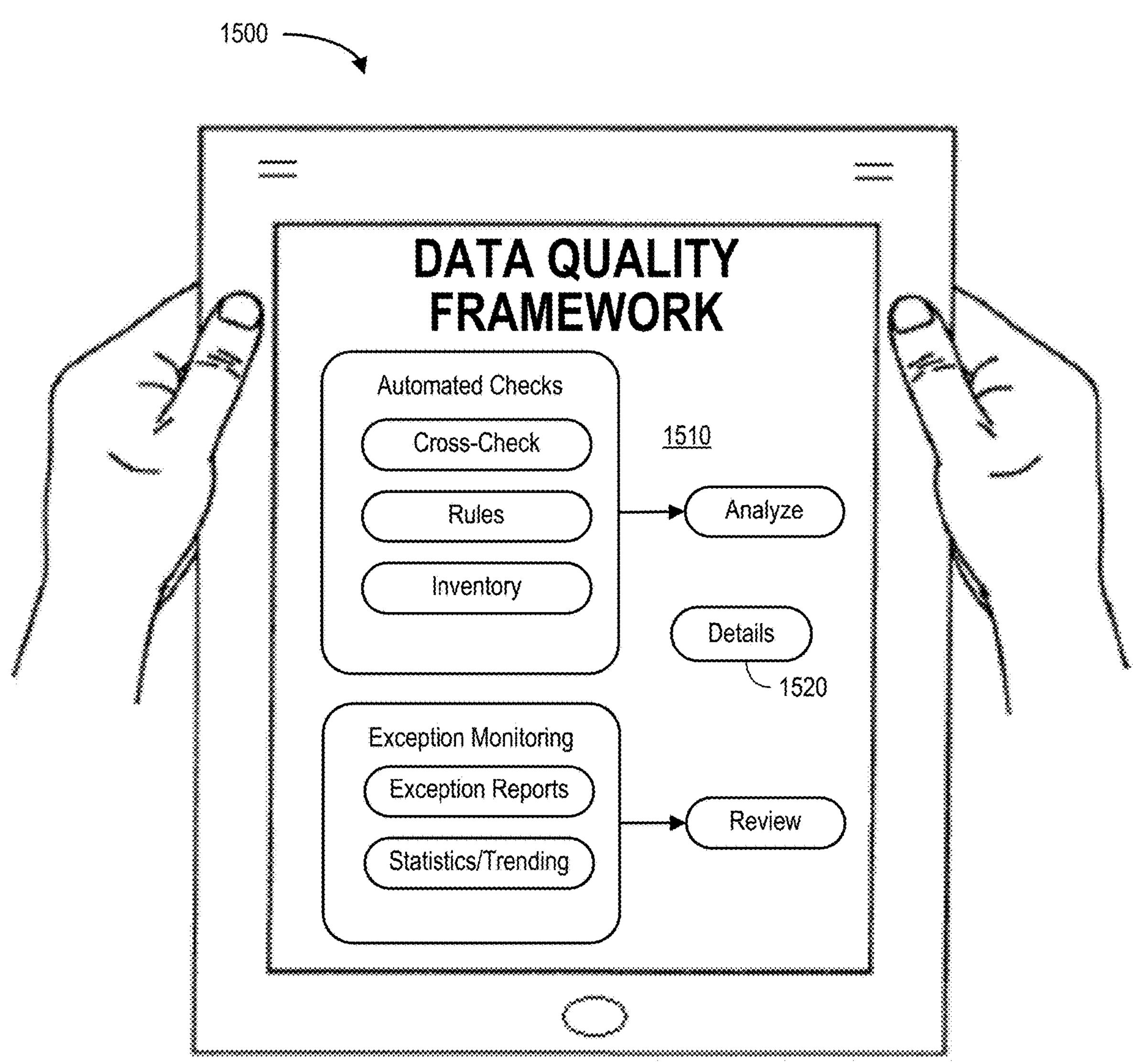
FIG. 15 illustrates a handheld tablet display in accordance with some embodiments.

FIG. 14 illustrates a smartphone display 1400 according to some embodiments. The display 1400 includes a summary 1410 of data quality results (e.g., metrics). Selection of a "Details" icon 1420 might result in the display of underlying information about the governed dataset. Similarly, FIG. 15 illustrates a handheld tablet display 1510 in accordance with some embodiments. The display 1510 includes a graphical representation of elements of a data quality framework. Selection of a "Details" icon 1520 might result in the display of underlying request characteristics of a validation engine.

Figure 16:
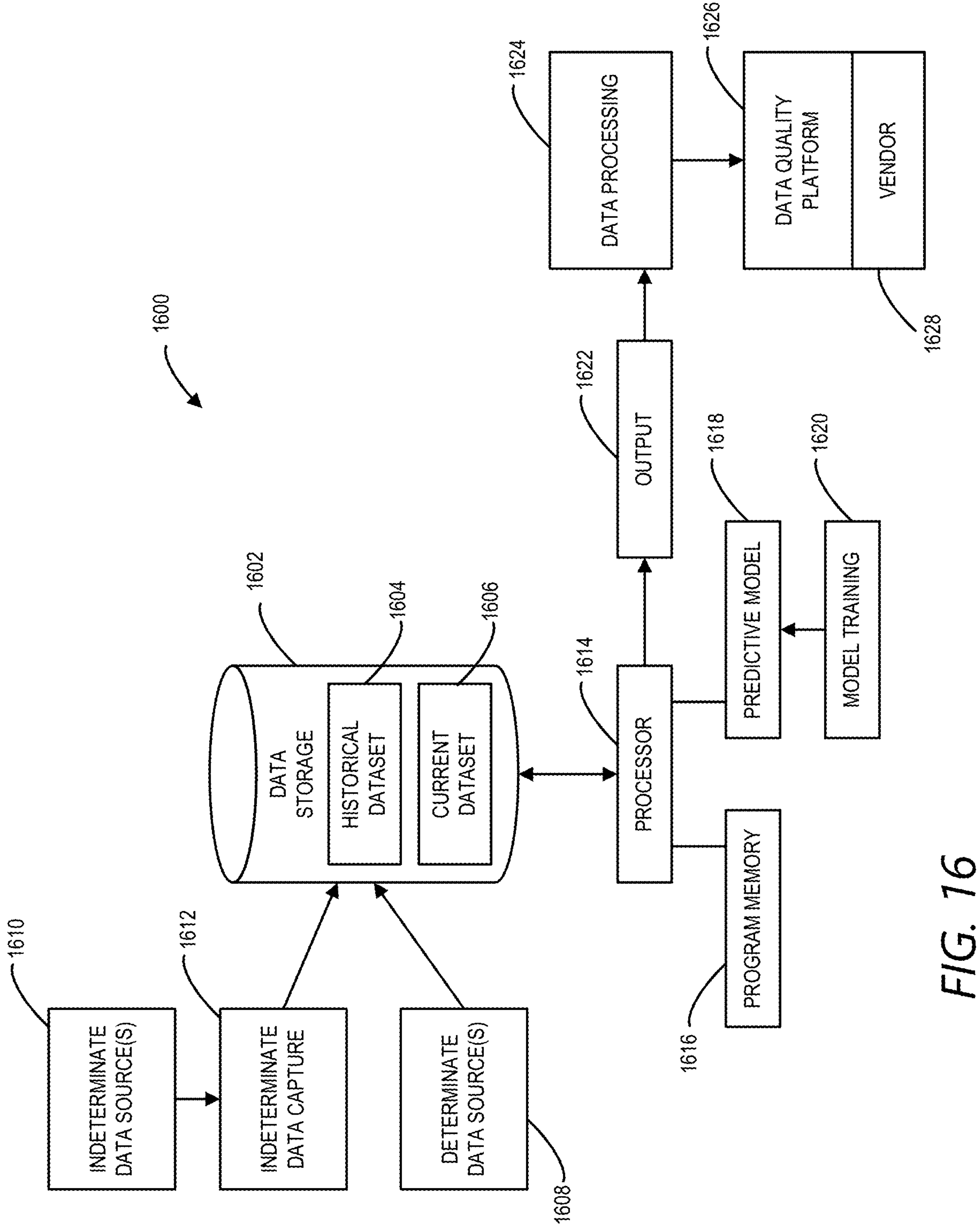
FIG. 16 illustrates a system associated with machine learning and a predictive model according to some embodiments.

According to some embodiments, machine learning and/or one or more predictive models may be used to evaluate data quality based on prior events and evaluations. Features of some embodiments associated with a predictive model will now be described by first referring to FIG. 16. FIG. 16 is a partially functional block diagram that illustrates aspects of a computer system 1600 provided in accordance with some embodiments of the invention. For present purposes, it will be assumed that the computer system 1600 is operated by an enterprise associated with one or more mutual funds (not separately shown) to support data quality monitoring and processing.

The computer system 1600 includes a data storage module 1602. In terms of its hardware the data storage module 1602 may be conventional, and may be composed, for example, of one or more magnetic hard disk drives. A function performed by the data storage module 1602 in the computer system 1600 is to receive, store and provide access to both a historical dataset (reference numeral 1604) and a current dataset (reference numeral 1606). As described in more detail below, the historical dataset 1604 is employed to train a predictive model to provide an output that indicates potential data quality issues, and the current dataset 1606 is thereafter analyzed by the predictive model. Moreover, as time goes by, and results become known from processing current information, at least some of the current information may be used to perform further training of the predictive model. Consequently, the predictive model may thereby adapt itself to changing event impacts and data quality results.

Either the historical dataset 1604 or the current dataset 1606 might include, according to some embodiments, determinate and indeterminate data. As used herein, "determinate data" refers to verifiable facts such as an asset name; an asset type; a date; an asset price; a date; a time of day; a day of the week; a geographic location, an address or ZIP code; a mutual fund number; etc.

As used herein, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from a data owner or steward might be associated with, for example, a data quality opinion.

The determinate data may come from one or more determinate data sources 1608 that are included in the computer system 1600 and are coupled to the data storage module 1602. The indeterminate data may originate from one or more indeterminate data sources 1610 and may be extracted from raw files or the like by one or more indeterminate data capture modules 1612. Both the indeterminate data source(s) 1610 and the indeterminate data capture module(s) 1612 may be included in the computer system 1600 and coupled directly or indirectly to the data storage module 1602. Examples of the indeterminate data source(s) 1610 may include data storage facilities for document images, for text files (e.g., vendor notes), digitized recorded voice files (e.g., oral statements), streams of video information, etc. Examples of the indeterminate data capture module(s) 1612 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual.

The computer system 1600 also may include a computer processor 1614. The computer processor 1614 may include one or more conventional microprocessors and may operate to execute programmed instructions to provide functionality as described herein. Among other functions, the computer processor 1614 may store and retrieve historical datasets 1604 and current datasets 1606 in and from the data storage module 1602. Thus, the computer processor 1614 may be coupled to the data storage module 1602.

The computer system 1600 may further include a program memory 1616 that is coupled to the computer processor 1614. The program memory 1616 may include one or more fixed storage devices, such as one or more hard disk drives, and one or more volatile storage devices, such as RAM devices. The program memory 1616 may be at least partially integrated with the data storage module 1602. The program memory 1616 may store one or more application programs, an operating system, device drivers, etc., all of which may contain program instruction steps for execution by the computer processor 1614.

The computer system 1600 further includes a predictive model component 1618. In certain practical embodiments of the computer system 1600, the predictive model component 1618 may effectively be implemented via the computer processor 1614, one or more application programs stored in the program memory 1616, and data stored as a result of training operations based on the historical datasets 1604 (and possibly also data received from a third-party reporting service). In some embodiments, data arising from model training may be stored in the data storage module 1602, or in a separate data store (not separately shown). A function of the predictive model component 1618 may be to determine appropriate simulation models, results, and/or scores (e.g., a rating indicating a likelihood of a data quality problem or issue). The predictive model component may be directly or indirectly coupled to the data storage module 1602.

The predictive model component 1618 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1600 includes a model training component 1620. The model training component 1620 may be coupled to the computer processor 1614 (directly or indirectly) and may have the function of training the predictive model component 1618 based on the historical datasets 1604 and/or information about data quality, incidents, and alerts. (As will be understood from previous discussion, the model training component 1620 may further train the predictive model component 1618 as further relevant data becomes available.) The model training component 1620 may be embodied at least in part by the computer processor 1614 and one or more application programs stored in the program memory 1616. Thus, the training of the predictive model component 1618 by the model training component 1620 may occur in accordance with program instructions stored in the program memory 1616 and executed by the computer processor 1614.

In addition, the computer system 1600 may include an output device 1622. The output device 1622 may be coupled to the computer processor 1614. A function of the output device 1622 may be to provide an output that is indicative of (as determined by the trained predictive model component 1618) data quality likelihood, events, alerts, and recommendations. The output may be generated by the computer processor 1614 in accordance with program instructions stored in the program memory 1616 and executed by the computer processor 1614. More specifically, the output may be generated by the computer processor 1614 in response to applying the data for the current simulation to the trained predictive model component 1618. The output may, for example, be a monetary estimate, a risk level, and/or likelihood within a predetermined range of numbers. In some embodiments, the output device may be implemented by a suitable program or program module executed by the computer processor 1614 in response to operation of the predictive model component 1618.

Still further, the computer system 1600 may include a data processing platform 1624. The data processing platform 1624 may be implemented in some embodiments by a software module executed by the computer processor 1614. The data processing platform 1624 may have the function of rendering a portion of the display on the output device 1622. Thus, the data processing platform 1624 may be coupled, at least functionally, to the output device 1622. In some embodiments, for example, the processing platform 1624 may direct workflow by referring to a data quality platform 1626, data quality reports and/or alerts generated by the predictive model component 1618 and found to be associated with various results or scores. In some embodiments, this data may be provided to a vendor 1628 (e.g., via an automatically established communication link) who may investigate potential data quality issues as appropriate. In this way, Artificial Intelligence ("AI") and/or machine learning scripts (e.g., R/Python) may be integrated into a data quality system to support advanced data quality checks (e.g., using dynamic binding).

Some embodiments may further support packaged application integration to support an ability to apply quality control validations to applications such as SALESFORCE® and ANAPLAN®. Other embodiment may support "QuickCheck" quality controls, such as templated quality control processes that can be added via configuration (without needing explicit SQL). For example, inventory checks might be supplied without the data owner needing to explicitly write rules. In addition to emailed alerts, embodiments might provide enhanced communication to support more parameter-driven control and more business-oriented communication (e.g., separate from the Information Technology ("IT") alerts) to allow more automated, readable, and instructive communications to vendors and other stakeholders.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. A system implemented via a data quality computer server, comprising:

(a) a validation database that contains:

electronic records connected to a data quality framework for an enterprise, the electronic records including a set of data validation rules, wherein at least one validation rule is associated with a Machine Learning ("ML") predictive model, and metadata defining validation groups that undergo a data quality process together;

(b) a data central console platform, coupled to the validation database, to provide validation administration for the data quality framework and an operational dashboard using an interactive graphical display via a distributed communication network, wherein the data central console platform uses the operational dashboard to perform all of: (i) failure review, (ii) failure classification, (iii) issue resolution, (iv) re-validation, and (v) case management integration to generate and track tickets to resolve data quality issues;

(c) governed datasets including information to be validated, the information to be validated including an integration of data from multiple sources;

(d) a data loading platform, coupled to the governed datasets, to retrieve the information to be validated; and (e) the data quality computer server, coupled to the validation database, the governed datasets, and the data loading platform, including:

a computer processor, and a computer memory, coupled to the computer processor, storing instructions that, when executed by the computer processor cause the data quality computer server to:

receive the information to be validated, retrieve, from the validation database, the set of data validation rules, automatically, and in response to receipt of the information to be validated, execute the set of data validation rules on the information to be validated to generate validation results, perform further training of the ML predictive model as results become known from processing current information such that the ML predictive model adapts itself to changing event impacts and data quality results, store the validation results, and perform all of: (i) cross-checks, (ii) inventory checks, and (iii) exception trending, wherein the data loading platform automatically transmits an alert message via an automatically established communication link to a communication address, associated with any of an email address, a web account, a smartphone number, a dashboard display, and a chat interface, based on the validation results generated by data quality computer server.

2. The system of claim 1, wherein the validation database further contains operational data including the validation results generated by the data quality computer server.

3. The system of claim 1, wherein the data central console platform is a web-based application that receives validation rules and metadata from a data quality developer in connection with the validation administration.

4. The system of claim 1, wherein the governed datasets include at least one of: (i) a legacy dataset, (ii) an operational data store, (iii) a data warehouse, and (iv) a cloud-based database.

5. The system of claim 1, wherein the data loading platform performs Extract Transform Load ("ETL") functions on the governed datasets.

6. The system of claim 1, wherein the data quality computer server executes validation rules comprising assertions and comparisons on the information to be validated to generate the validation results.

7. The system of claim 6, wherein the data quality computer server is further to perform at least one of: (i) exception reporting, and (ii) exception statistics.

8. The system of claim 1, wherein the validation results are associated with at least one of: (i) regulatory results, (ii) a number of electronic records, (iii) a number of files, (iv) a number of validations, (v) alert information, (vi) incident data, and (vii) impacting incident data.

9. A computerized method implemented via a data quality computer server, comprising:

storing, in a validation database:

electronic records connected to a data quality framework for an enterprise, the electronic records including a set of data validation rules, wherein at least one validation rule is associated with a Machine Learning ("ML") predictive model, and metadata defining validation groups that undergo a data quality process together;

providing, via a data central console platform, validation administration for the data quality framework and an operational dashboard using an interactive graphical display via a distributed communication network, wherein the data central console platform uses the operational dashboard to perform all of: (i) failure review, (ii) failure classification, (iii) issue resolution, (iv) re-validation, and (v) case management integration to generate and track tickets to resolve data quality issues;

retrieving, by a data loading platform from governed datasets, information to be validated;

receiving, at a computer processor of the data quality computer server, the information to be validated;

automatically, and in response to receipt of the information to be validated, executing the set of data validation rules on the information to be validated to generate validation results;

performing further training of the ML predictive model as results become known from processing current information such that the ML predictive model adapts itself to changing event impacts and data quality results;

storing the validation results;

performing all of: (i) cross-checks, (ii) inventory checks, and (iii) exception trending;

and automatically transmitting an alert message via an automatically established communication link to a communication address, associated with any of an email address, a web account, a smartphone number, a dashboard display, and a chat interface, based on the validation results.

10. The method of claim 9, wherein the validation database further contains operational data including the validation results generated by the data quality computer server.

11. The method of claim 9, wherein the data central console platform is a web-based application that receives validation rules and metadata from a data quality developer in connection with the validation administration.

12. The method of claim 9, wherein the governed datasets include at least one of: (i) a legacy dataset, (ii) an operational data store, (iii) a data warehouse, and (iv) a cloud- based database.

13. A non-transitory, computer-readable medium storing instructions, that, when executed by a processor, cause the processor to perform a method implemented via a data quality computer server, the method comprising:

storing, in a validation database:

electronic records connected to a data quality framework for an enterprise, the electronic records including a set of data validation rules, wherein at least one validation rule is associated with a Machine Learning ("ML") predictive model, and metadata defining validation groups that undergo a data quality process together;

providing, via a data central console platform, validation administration for the data quality framework and an operational dashboard using an interactive graphical display via a distributed communication network, wherein the data central console platform uses the operational dashboard to perform all of: (i) failure review, (ii) failure classification, (iii) issue resolution, (iv) re-validation, and (v) case management integration to generate and track tickets to resolve data quality issues;

retrieving, by a data loading platform from governed datasets, information to be validated;

receiving, at a computer processor of the data quality computer server, the information to be validated;

automatically, and in response to receipt of the information to be validated, executing the set of data validation rules on the information to be validated to generate validation results;

performing further training of the ML predictive model as results become known from processing current information such that the ML predictive model adapts itself to changing event impacts and data quality results;

storing the validation results;

performing all of: (i) cross-checks, (ii) inventory checks, and (iii) exception trending; and automatically transmitting an alert message via an automatically established communication link to a communication address, associated with any of an email address, a web account, a smartphone number, a dashboard display, and a chat interface, based on the validation results.

14. The medium of claim 13, wherein the data loading platform performs Extract Transform Load ("ETL") functions on the governed datasets.

15. The medium of claim 13, wherein the data quality computer server executes validation rules comprising assertions and comparisons on the information to be validated to generate the validation results.

16. The medium of claim 15, wherein the data quality computer server is further to perform at least one of: (i) exception reporting, and (ii) exception statistics.

17. The medium of claim 13, wherein the validation results are associated with at least one of: (i) regulatory results, (ii) a number of electronic records, (iii) a number of files, (iv) a number of validations, (v) alert information, (vi) incident data, and (vii) impacting incident data.

* * * * *